(12) United States Patent
Furudate et al.

(10) Patent No.: US 9,071,346 B2
(45) Date of Patent: Jun. 30, 2015

(54) RECEIVER AND RECEIVING METHOD

(71) Applicant: FUJITSU LIMITED, Kawasaki-shi, Kanagawa (JP)

(72) Inventors: Hideki Furudate, Ota (JP); Minoru Okada, Ikoma (JP); Ziji Ma, Ikoma (JP); Tomonori Sato, Ikoma (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/533,761

(22) Filed: Nov. 5, 2014

(65) Prior Publication Data

US 2015/0131704 A1 May 14, 2015

(30) Foreign Application Priority Data

Nov. 11, 2013 (JP) ................................. 2013-233141

(51) Int. Cl.
*H04B 1/715* (2011.01)
*H04L 25/02* (2006.01)

(52) U.S. Cl.
CPC ............ *H04B 1/715* (2013.01); *H04L 25/0212* (2013.01)

(58) Field of Classification Search
CPC . H04L 5/0007; H04L 5/0048; H04L 25/0202; H04L 25/0204; H04L 25/0212; H04L 25/0228; H04L 25/0242; H04L 25/022; H04B 1/715
See application file for complete search history.

(56) References Cited

U.S. PATENT DOCUMENTS

| | | |
|---|---|---|
| 2003/0179825 A1 | 9/2003 | Sekiguchi et al. |
| 2009/0103602 A1 | 4/2009 | Xiong et al. |
| 2011/0261905 A1* | 10/2011 | Shental et al. ................. 375/316 |
| 2012/0082252 A1* | 4/2012 | Annavajjala et al. .......... 375/260 |
| 2013/0121392 A1* | 5/2013 | Thompson et al. ............ 375/227 |
| 2013/0128932 A1* | 5/2013 | Huang et al. .................. 375/219 |

FOREIGN PATENT DOCUMENTS

| | | |
|---|---|---|
| EP | 0 933 943 A2 | 8/1999 |
| JP | 2000-4166 A | 1/2000 |
| JP | 2002-315004 A | 10/2002 |

(Continued)

OTHER PUBLICATIONS

Bajwa, Waheed et al., "Compressed Channel Sensing: A New Approach to Estimating Sparse Multipath Channels," Proceedings of the IEEE, vol. 98, No. 6, pp. 1058-1076, Jun. 2010.

(Continued)

*Primary Examiner* — Syed Haider
(74) *Attorney, Agent, or Firm* — Arent Fox LLP

(57) ABSTRACT

A receiver for receiving a frame including a pilot signal and a data signal, referring to an impulse response of a propagation path estimated from the pilot signal, and performing compensation processing on the data signal, the receiver includes: an extraction unit configured to extract the pilot signal of the frame; and an estimation unit configured to execute orthogonal matching pursuit (OMP) method which is a decoding algorithm for compressive sensing and to estimate the impulse response from the pilot signal, wherein the estimation unit refers to a pilot signal of a first frame, estimates an impulse response, determines position information on the estimated impulse response, refers to a pilot signal corresponding to the determined position information, of a second frame subsequent to the first frame, estimates an impulse response, and determines position information on the estimated impulse response.

9 Claims, 10 Drawing Sheets

(56) References Cited

FOREIGN PATENT DOCUMENTS

| | | |
|---|---|---|
| JP | 2006-523390 A | 10/2006 |
| JP | 2011-146813 A | 7/2011 |
| JP | 2011-146814 A | 7/2011 |
| JP | 2013-46131 A | 3/2013 |

OTHER PUBLICATIONS

Donoho, David, "Compressed Sensing," IEEE Transactions on Information Theory, vol. 52, No. 4, pp. 1289-1306, Apr. 2006.

Tropp, Joel, "Signal Recovery From Random Measurements via Orthogonal Matching Pursuit," IEEE Transactions on Information Theory, vol. 53, No. 12, pp. 4655-4666, Dec. 2007.

\* cited by examiner

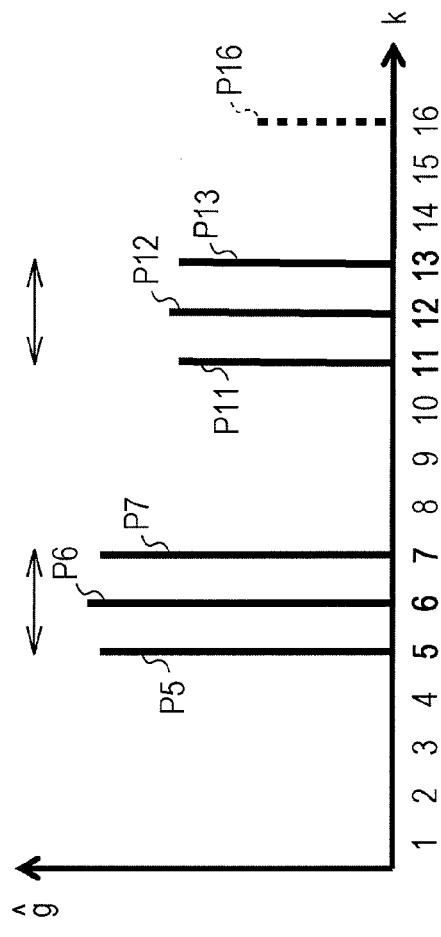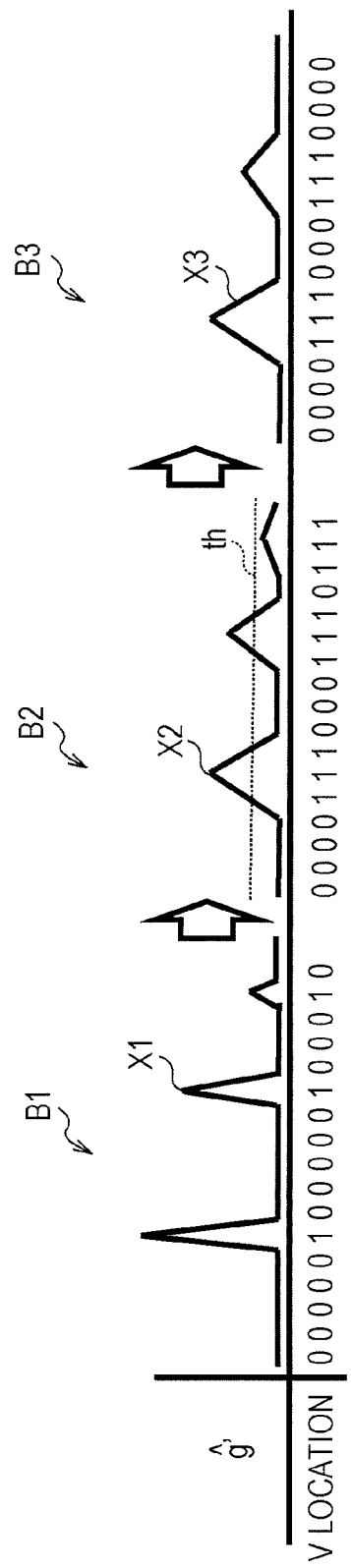

FIG. 9

| SYSTEM MODEL | ISDB-T mode 3 |
|---|---|
| NOISE TYPE | AWGN |
| MODULATION TYPE | QPSK |
| DATA SUBCARRIER | 3744 |
| PILOT SUBCARRIER | 1872 |
| FFT SIZE | 8192 |
| GI RATIO | 1/8 |
| PATH MODEL | $\delta(t) + 1/2\delta(t-1)$ |

RECEIVER AND RECEIVING METHOD

CROSS-REFERENCE TO RELATED APPLICATION

This application is based upon and claims the benefit of priority from the prior Japanese Patent Application No. 2013-233141 filed on Nov. 11, 2013, the entire contents of which are incorporated herein by reference.

FIELD

The embodiments discussed herein are related to a receiver and a receiving method.

BACKGROUND

In digital terrestrial television broadcasting and wireless local area network (WLAN), a method called orthogonal frequency division multiplex (OFDM) is used in order to avoid the effect of waveform distortion due to multipath transmission. In the OFDM, the transmission band is divided into a plurality of narrow band signals and parallel transmission is performed using each of the divided narrow band signals, thereby making it possible to perform broadband transmission while avoiding the effect of waveform distortion due to multipath transmission.

In the OFDM, multiple phase shift keying (PSK) and/or multiple quadrature amplitude modulation (QAM) are used as a modulation method for each narrow band signal. In this case, the amplitude and phase of each narrow band signal vary according to a multipath propagation path, and thus it is preferable to estimate a frequency response or an impulse response of a propagation path in order to perform demodulation of PSK and/or QAM.

In order to estimate a propagation path, a known signal is inserted as a pilot signal in part of OFDM transmission signals. A receiver extracts the pilot signal and determines the amplitude and phase variation of the pilot signal. The receiver may estimate frequency response characteristics by performing interpolation processing on the determined amplitude and phase variation of the pilot signal.

For conventional estimation of frequency response characteristics, an interpolation method, which uses a linear filter, is utilized. However, this method has a problem in that estimation accuracy significantly reduces due to noise.

Also, frequency hopping spread spectrum is known as another method for performing broadband communication in a multipath propagation path. By this method, a transmitter multiplies each narrow band modulation signal by a pseudo spreading code sequence having a wide band, thereby spreading the frequency spectrum to perform transmission. The receiver determines a cross correlation between the pseudo spreading code sequence used for the spreading and a received signal, thereby determining the original narrow band modulation signal. Also, when a cross correlation is determined, an impulse response of the multipass propagation path may be estimated from the relationship between a delay time given to the pseudo spreading code sequence and the cross correlation. However, because the impulse response characteristics determined from the cross correlation is affected by thermal noise, a problem arises in that impulse response estimation accuracy reduces.

The multipath propagation path includes finite number of paths. In such a situation, an impulse response has an impulse at a delay time position of each path and is 0 at almost other delay time positions. A technique called compressed sensing has been recently proposed, by which an object is estimated with high accuracy in the case where the object to be estimated has 0 at most positions (for example, time positions) and has a non-zero value only at partial positions, that is, the object has sparse property. A sparse vector indicates a vector consisting of elements that are almost 0.

The following are patent reference documents: Japanese Laid-open Patent Publication No. 2013-46131, Japanese Laid-open Patent Publication No. 2011-146813, Japanese Laid-open Patent Publication No. 2011-146814, Japanese National Publication of International Patent Application No. 2006-523390, Japanese Laid-open Patent Publication No. 2002-315004, and Japanese Laid-open Patent Publication No. 2000-4166.

The following are non-patent reference documents: D. L Donoho, "Compressed sensing", IEEE Trans. on Information Theory, vol. 52, no. 4, pp. 1289-1306, April 2006 (Non-patent Reference 1), W. U. Bajwa, J. Haupt, A. M. Sayeed, and R. Nowak, "Compressed channel sensing: A new approach to estimating sparse multipath channels", Proceedings of the IEEE, vol. 98, no. 6, pp. 1058-1076, June 2010 (Non-patent Reference 2), and J. A. Tropp, and A. C. Gilbert, "Signal recovery from random measurements via orthogonal matching pursuit", IEEE Transactions on Information Theory, vol. 53, no. 12, pp. 4655-4666, December 2007 (Non-patent Reference 3).

SUMMARY

According to an aspect of the invention, a receiver for receiving a frame including a pilot signal and a data signal, referring to an impulse response of a propagation path estimated from the pilot signal, and performing compensation processing on the data signal, the receiver includes: an extraction unit configured to extract the pilot signal of the frame; and an estimation unit configured to execute orthogonal matching pursuit (OMP) method which is a decoding algorithm for compressive sensing and to estimate the impulse response from the pilot signal, wherein the estimation unit refers to a pilot signal of a first frame, estimates an impulse response, determines position information on the estimated impulse response, refers to a pilot signal corresponding to the determined position information, of a second frame subsequent to the first frame, estimates an impulse response, and determines position information on the estimated impulse response.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are each an exemplary diagram schematically illustrating a search index.

FIG. 9 is a table illustrating the specification of a system which is used for analysis of the bit error rate characteristics described with reference to FIG. 8.

DESCRIPTION OF EMBODIMENTS

Figure 1:
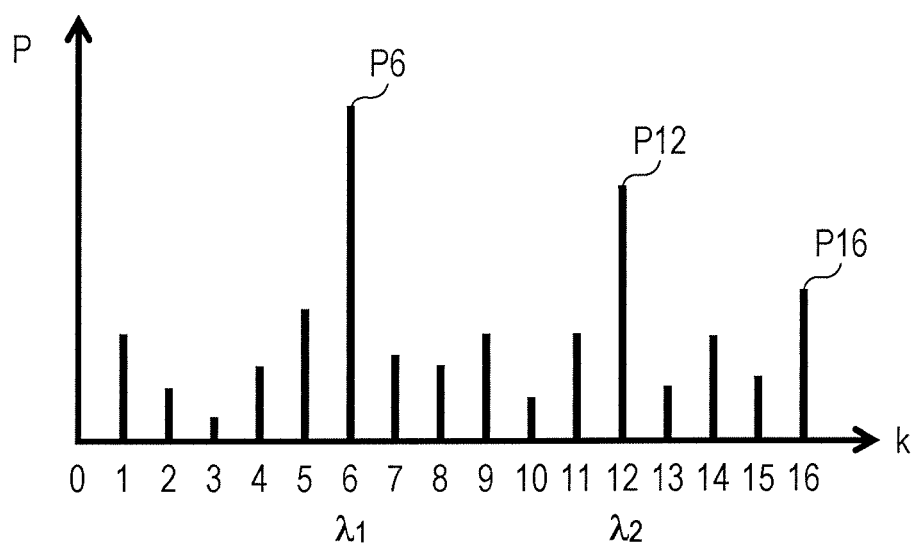
FIG. 1 is a graph illustrating a distribution of impulse responses on the time axis.

When an impulse response of a multipath propagation path is estimated using compressive sensing, the amount of calculation for estimating the impulse response may be significantly large.

In the following, a receiver will be described that reduces the amount of calculation for estimating an impulse response of a multipath propagation path using compressive sensing.
(Estimation of Impulse Response of Multipass Propagation Path)

Before a receiver of the present embodiment is described, the technique for estimating an impulse response of a multipath propagation path using compressive sensing will be described. For example, in Non-patent Reference 1, a technique for estimating a vector having a sparse property from an observation vector is proposed.

This technique is a method for estimating a vector by searching for a vector for which the sum of the absolute value of each element has a minimum. In the technique, it is possible for to use a linear programming which is widely known. As a propagation path estimation method using the technique, Non-patent Reference 2 proposes a method that uses compressive sensing as the propagation path estimation technique for the OFDM or frequency hopping spread spectrum, and claims that impulse response estimation accuracy has been improved.

On the other hand, orthogonal matching pursuit (OMP) method has been proposed as another estimation technique for a sparse vector. For example, Non-patent Reference 3 proposes the OMP method. In this method, an expectation value of an observation vector corresponding to each pulse is prepared beforehand, and the distance between the expectation value and the observation vector is calculated. The method then determines the presence of a pulse which corresponds to an expectation value vector with the nearest distance.

Subsequently, a component for the corresponding pulse is removed from the observation vector, and the distance calculation is repeated again. The method also makes it possible to estimate a vector having a sparse property.

The receiver explained in the first and second embodiments described below estimates an impulse response of a multipath propagation path utilizing the OMP method and modified matching pursuit (MMP) method which is obtained by modifying the OMP method. First, the OMP method will be described using expressions (1) to (18), then a specific example of the OMP method will be described with reference to FIGS. 1 to 3.

Suppose that an observation vector y is expressed by the following expression (1). The observation vector corresponds to a signal in a time domain which is obtained by performing inverse fast Fourier transformation on a pilot signal extracted from signals in a frequency domain. The signals are obtained by performing fast Fourier transformation on signals (for example, OFDM signals) in a time domain for one frame, which are received by a receiver from a transmitter, for example. Hereinafter, the fast Fourier transformation is denoted by FFT as appropriate. The inverse fast Fourier transformation is denoted by IFFT as appropriate.

$$y = Xg + z \tag{1}$$

$$y = \begin{pmatrix} y_1 \\ \vdots \\ y_n \\ \vdots \\ y_N \end{pmatrix} \tag{2}$$

As expressed by expression (2), y in expression (1) is an N-dimensional observation vector (N is an integer greater than or equal to 1). The N corresponds to the number of carriers in the OFDM. In the case of a receiver that receives signals for digital terrestrial broadcasting, the N is, for example, 8192.

$$g = \begin{pmatrix} g_1 \\ \vdots \\ g_k \\ \vdots \\ g_K \end{pmatrix} \tag{3}$$

As expressed by expression (3), g in expression (1) is a K-dimensional impulse response vector (K is an integer greater than or equal to 1). K indicates a time (for example, sampling time), and the change 1, . . . k (lowercase letter), . . . K (uppercase letter) indicates a change in time. That is, expression (3) gives a K-dimensional impulse response vector which indicates a time position of an impulse response.

The impulse response g has a sparse property. The impulse response g is a vector in which almost all elements are 0 except for several elements for which a pulse is present.

$$z = \begin{pmatrix} z_1 \\ \vdots \\ z_n \\ \vdots \\ z_N \end{pmatrix} \tag{4}$$

Expression (4) is a vector that represents noise.

$$X = \begin{pmatrix} x_{11} & \cdots & x_{1k} & \cdots & x_{1K} \\ \vdots & & \vdots & & \vdots \\ x_{n1} & \cdots & x_{nk} & \cdots & x_{nK} \\ \vdots & & \vdots & & \vdots \\ x_{N1} & \cdots & x_{Nk} & \cdots & x_{NK} \end{pmatrix} = (x_1 \ \ldots \ x_k \ \ldots \ x_K) \quad (5)$$

X expressed by expression (5) is a matrix that represents a transformation between a sparse vector and an observation vector. More specifically, X is a matrix (first matrix) with N rows and K columns that represents a transformation between the N-dimensional observation vector and the K-dimensional impulse response vector g.

The matrix is also called a sensing matrix X which is pre-defined.

$$x_k = \begin{pmatrix} x_{1k} \\ \vdots \\ x_{nk} \\ \vdots \\ x_{Nk} \end{pmatrix} \quad (6)$$

Expression (6) is a vector consisting of the elements in the kth column of the sensing matrix X.

In the OMP method, an impulse response g is obtained from an observation vector y by the following steps. First, as expressed by the following expression (7), the observation vector y is substituted for a residual vector.

$$r_0 = y \quad (7)$$

Here, $r_t$ is a residual vector obtained after search iterations for t times. In the following calculation, only the columns corresponding to the positions of non-zero elements of a sparse vector are extracted from the sensing matrix X, and a new matrix (referred to as a provisional sensing matrix as appropriate) is generated. The initial value of matrix for generating a new matrix is defined by the following expression (8).

$$X_0 = 0 \quad (8)$$

The initial matrix is a matrix with all elements of 0. Repeated application of the OMP method is then started. First, a loop counter t is updated by the following expression (9).

$$t \leftarrow t+1 \quad (9)$$

Next, a column vector closest to the residual vector is determined by the following expression (10).

$$\lambda_t = \underset{k \in S}{\operatorname{argmax}} |\langle r_{t-1}, x_k \rangle| \quad (10)$$

Here, $\langle x, y \rangle$ is the inner product of vectors x and y. k which maximizes the inner product $\langle r_{t-1}, x_k \rangle$ is determined by expression (10), and the determined k is substituted for $\lambda_t$. S is the set of integers 1, ... K excluding already selected $\lambda_t$. That is, S may be expressed by the following expression (11).

$$S = \{1, 2, \ldots, K\} - \{\lambda_1, \ldots, \lambda_t\} \quad (11)$$

Next, the $\lambda_t$th column vector below in the sensing matrix X is connected to the right side of the provisional sensing matrix $X_{t-1}$ to generate a new provisional sensing matrix, expression (12).

$$X_{\lambda_t}$$

$$X_t = (X_{t-1} x_{\lambda_t}) \quad (12)$$

Next, the calculation expressed by the following expression (13) is performed.

$$\hat{h}_t = \underset{h}{\operatorname{argmin}} \|r_{t-1} - X_t h\|^2 = X_t^+ r_{t-1} \quad (13)$$

By expression (13), h which minimizes $\|r_{t-1} - X_t h\|^2$ is determined. $X_t h$ in expression (13) is a provisional estimated value of an impulse response.

h expressed in expression (13) is a t-dimensional column vector consisting of the values of selected elements of a sparse vector, as expressed by the following expression (14).

$$h = \begin{pmatrix} h_1 \\ \vdots \\ h_t \end{pmatrix} \quad (14)$$

Expression (13) gives an estimated value of the t-dimensional column vector h which is expressed by the following expression (15).

$$\hat{h}_t = \begin{pmatrix} \hat{h}_1 \\ \vdots \\ \hat{h}_t \end{pmatrix} \quad (15)$$

The following matrix expressed in expression (13) is the pseudo inverse matrix of the provisional sensing matrix $X_t$. Using the estimated value, the residual vector is updated as expressed by expression (16). The h corresponds to the impulse response g. The reason why h is used instead of g is because the g has a dimension of K whereas the h has a dimension of t. The t is a loop counter.

$$X_t^+$$

$$r_t = r_{t-1} - X_t \hat{h}_t \quad (16)$$

The processing from updating the loop counter to updating the residual vector is repeated until the magnitude of the residual vector becomes less than a predetermined threshold value so as to satisfy the below expression (17) (s is a predetermined threshold value) or the loop counter (the number of repeat) t reaches K, that is, t=K is satisfied.

$$\|r_t\|^2 < \epsilon \quad (18)$$

The left side of expression (17) represents a squared distance. Finally, the impulse response as a sparse vector is estimated by the following expression (18).

$$\hat{g} = (e_{\lambda_1}, e_{\lambda_2}, \ldots, e_{\lambda_t}) \hat{h}t \quad (18)$$

Here, $e_{k'}$ is a vector such that k'th element is 1 and the other elements are 0.

(Specific Example of OMP Method)

Next, a specific example of the OMP method will be described with reference to FIGS. 1 to 3. FIG. 1 is a graph illustrating a distribution of impulse responses on the time axis. The horizontal axis indicates time and the vertical axis indicates the power of an impulse response. In FIG. 1, the power of noise component is also illustrated. In FIG. 1, the power component at each time k (1 to 16) corresponds to the observation vector y expressed by expression (1).

Figure 2:
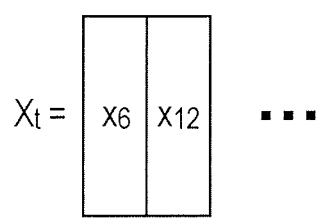
FIG. 2 schematically illustrates a provisional sensing matrix $X_r$.

FIG. 2 schematically illustrates a provisional sensing matrix $X_t$. FIG. 3 illustrates a distribution of impulse responses on the time axis, the impulse responses being obtained by applying the MMP method to the power components of the impulse responses illustrated in FIG. 1. The graphs of FIG. 1 and FIG. 3 are also called a delay profile. In the graphs of FIG. 1, FIG. 3, the power of the impulse response of the main wave is present at the position where k (time) is 0.

In FIG. 1, between the powers at k of 1 to 16, the greatest power is the power (symbol P6) at k of 6, and the second greatest power is the power (symbol P12) at k of 12.

Suppose that two propagation paths corresponding to a delay wave are present and the power at k of 6 and the power at k of 12 correspond to the powers of the impulse responses of the delay wave. It is to be noted that the third greatest power is the power (symbol P16) at k of 16.

First, after expressions (1) to (8) are defined, 0 is substituted for t in expression (9), which represents the loop counter and t=1 is obtained.

Substituting t=1 into expression (10) gives the following expression (19).

$$\lambda_1 = \underset{k \in S}{\operatorname{argmax}} |\langle r_0, x_k \rangle| \tag{19}$$

In expression (19), k which maximizes $\lambda_1$ is determined. In the example of FIG. 1, because the greatest power is given by the power at k=6 (see symbol P6), the inner product of expression (19) has a maximum at k=6. Consequently, the numerical value corresponding to the element number $\lambda_1$ is 6.

Substituting t=1 and the element number $\lambda_1$=6 into expression (12) gives the following expression (20).

$$X_1 = (X_0 x_6) \tag{20}$$

The part $x_6$ in FIG. 2 schematically illustrates the representation of expression (20).

Substituting t=1 into expression (13) gives the following expression (21).

$$\hat{h}_1 = \underset{h}{\operatorname{argmin}} \|r_0 - X_1 h\|^2 = X_1^+ r_0 \tag{21}$$

Subsequently, the residual vector $r_1$ expressed by the following expression (22) is calculated by expression (16).

$$r_1 = r_0 - X_1 \hat{h}_1 \tag{22}$$

At this point, suppose that the magnitude of the residual vector $r_1$ is not less than the predetermined threshold value (see expression (17)) and t=K is not satisfied. Thus, substituting t=1 into the right side of expression (9) expressing an increment of the loop counter t gives t=2.

Substituting t=2 into expression (10) gives the following expression (23).

$$\lambda_2 = \underset{k \in S}{\operatorname{argmax}} |\langle r_1, x_k \rangle| \tag{23}$$

In expression (23), k which maximizes $\lambda_2$ is determined. In the example of FIG. 1, because the second greatest power is given by the power at k=12 (see symbol P12), the inner product of expression (23) has a maximum at k=12. Consequently, the numerical value corresponding to the element number $\lambda_2$ is 12.

Substituting t=2 and the element number $\lambda_2$=12 into expression (12) gives the following expression (24).

$$X_2 = (X_1 x_{12}) \tag{24}$$

The part $x_6 x_{12}$ in FIG. 2 schematically illustrates the representation of expression (24).

Substituting t=2 into expression (13) gives the following expression (25).

$$\hat{h}_2 = \underset{h}{\operatorname{argmin}} \|r_1 - X_2 h\|^2 = X_2^+ r_1 \tag{25}$$

Subsequently, the residual vector $r_2$ expressed by the following expression (26) is calculated according to expression (16).

$$r_2 = r_1 - X_2 \hat{h}_2 \tag{26}$$

Here, suppose that the magnitude of the residual vector $r_2$ is less than the predetermined threshold value (see expression (17)). Thus, the part $(e\lambda_1, e\lambda_2, \ldots e\lambda_t)$ in expression (18) is given by $(e_6, e_{12})$. The vector e is, for example, a vector having a maximum number of elements of K, and the K is 16 in the example of FIG. 1.

Here, $e_6$ is given by $[0, 0, 0, 0, 0, 1, 0, 0, 0, 0, 0, 0, 0, 0, 0, 0]^T$ in which only the 6th element is 1, where T indicates a transposed matrix.

$e_{12}$ is given by $[0, 0, 0, 0, 0, 0, 0, 0, 0, 0, 0, 1, 0, 0, 0, 0]^T$ in which only the 12th element is 1.

Consequently, the matrix for the part $(e\lambda_1, e\lambda_2, \ldots e\lambda_t)$ in expression (18) is the 16×2 matrix expressed by expression (27).

$$\begin{pmatrix} 0 & 0 \\ 0 & 0 \\ 0 & 0 \\ 0 & 0 \\ 0 & 0 \\ 1 & 0 \\ 0 & 0 \\ 0 & 0 \\ 0 & 0 \\ 0 & 0 \\ 0 & 0 \\ 0 & 1 \\ 0 & 0 \\ 0 & 0 \\ 0 & 0 \\ 0 & 0 \end{pmatrix} \tag{27}$$

Figure 3:
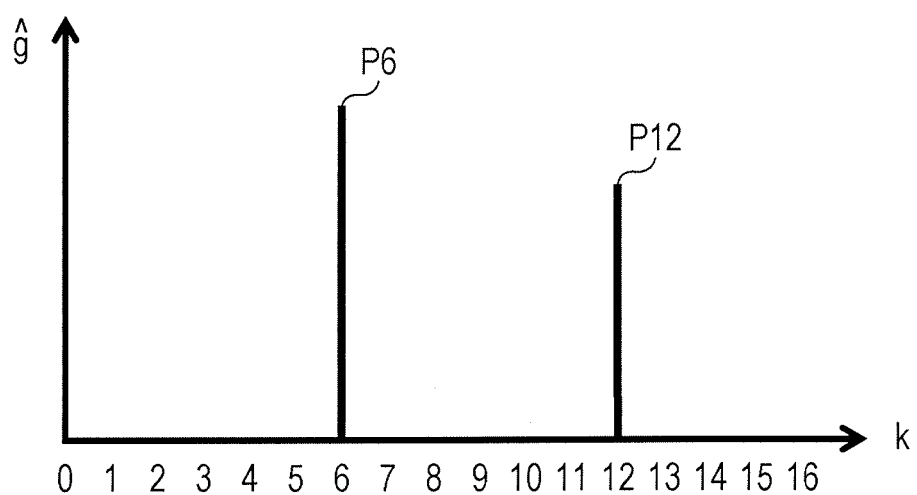
FIG. 3 illustrates a distribution of impulse responses on the time axis, the impulse responses being obtained by applying MMP method to the power components of the impulse responses illustrated in FIG. 1.

By the above processing, it is presumed that two impulse responses (see symbol P6 and symbol P12) of delay wave are at time positions of k=6, 12 as illustrated in FIG. 3.

By estimating an impulse response of a multipath propagation path by the OMP method described above, the amount of calculation may be reduced compared with a solution using L1 norm (sum of the absolute value of the value of each dimension) of linear programming. However, correlation calculation processing is preferably performed even for an estimation by the OMP method, and a problem arises in that the amount of calculation taken for the estimation is significantly large. For example, according to expression (10), the calculation of expression (10) has to be performed on all elements of the set S (see expression (11)), and thus the amount of calculation is significantly large.

In addition, depending on the magnitude of the threshold value $\epsilon$ in expression (17), the number of iterations of correlation calculation processing (increment of the loop counter t) may increase, and calculation may be repeatedly performed on a point other than an actual communication path. In the example of FIG. 1, it may be estimated that the power at k of 16 (see symbol P16) is also an impulse response of a delay wave. In other words, it may be determined that a point corresponding to an impulse response not originally from a communication path is a non-zero impulse response. Consequently, an error in calculating a delay profile increases.

First Embodiment

Summary of MMP Method

Thus, in the present embodiment, the MMP method, which is obtained by modifying the OMP method, is proposed. The MMP method allows the number of iterations of correlation calculation to be decreased, and consequently, the amount of calculation and processing delay time may be significantly reduced.

The peak position of an impulse response has such characteristics that a change of the peak position in time is relatively slow. In other words, it may be presumed that a first time position of an impulse response in the first frame and a second time position of an impulse response in the second frame subsequent to the first frame are substantially the same.

Here, suppose that the first time position of the impulse response in the first frame is k=6 in the example of FIG. 3. Then, it may be presumed that the second time position of the impulse response in the second frame subsequent to the first frame is at time positions prior to and subsequent to k=6 in time, for example, k=5, k=7.

By utilizing such characteristics, a candidate for an expectation vector may be limited to the peripheral area of a previously identified vector by the OMP method. It is to be noted that an expectation vector corresponds to a column component of the sensing matrix X (see expression (5), expression (6)).

Consequently, the number of candidates to be searched of an expectation vector may be significantly reduced, and thus the amount of calculation may be reduced.

(Receiver)

Figure 4:
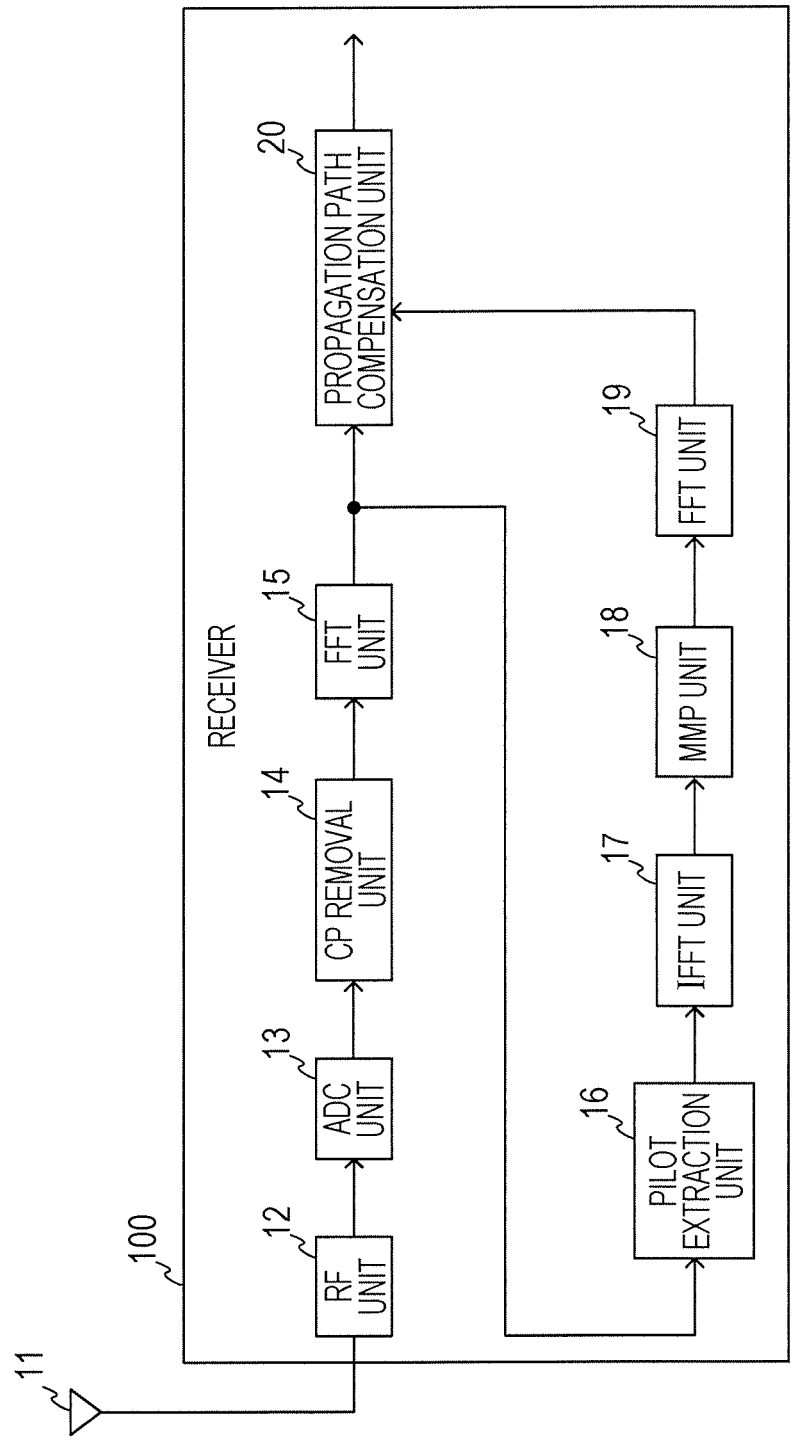
FIG. 4 is an exemplary block diagram illustrating the hardware configuration of a receiver in the present embodiment.

FIG. 4 is an exemplary block diagram illustrating the hardware configuration of a receiver in the present embodiment. A receiver 100 has an RF unit 12, an ADC unit 13, a CP removal unit 14, and an FFT unit 15. It is to be noted that CP is an abbreviation of cyclic prefix.

In addition, the receiver 100 has a pilot extraction unit 16, an IFFT unit 17, an MMP unit (estimation unit) 18, an FFT unit 19, and a propagation path compensation unit 20. Hereinafter, the MMP unit (estimation unit) is denoted as the MMP unit as appropriate.

An antenna 11 connected to the RF unit 12 transmits and receives, for example, a radio signal of the OFDM to and from a transmitter which is not illustrated, and outputs the received radio signal to the RF unit 12. The RF unit 12 performs processing including down conversion processing and quadrature demodulation processing on the signal inputted from the antenna 11, and outputs a reception signal. The ADC unit 13 converts the reception signal inputted from the RF unit 12 into a digital signal and outputs the converted signal.

The CP removal unit 14 removes CP from a digital signal inputted from the ADC unit 13, and outputs the digital signal with the CP removed. The FFT unit 15 performs FFT processing on an effective symbol with the CP removed, converts the digital signal in the time domain into a digital signal in the frequency domain, and outputs the converted digital signal.

The pilot extraction unit 16 extracts a pilot signal (also called a known signal) in a frame from the digital signal in the frequency domain, the frame including the pilot signal and a data signal. Particularly, the pilot extraction unit 16 extracts a pilot signal per frame from the digital signal which has undergone the FFT processing, and outputs the extracted pilot signal.

The IFFT unit 17 performs the IFFT processing on the extracted pilot signal, and converts the pilot signal in the frequency domain into a pilot signal in the time domain.

The MMP unit 18 executes the OMP method, which is a decoding algorithm for compressive sensing, and estimates an impulse response of a propagation path from the pilot signal in the time domain. That is, the MMP unit 18 applies the OMP method and the MMP method to the pilot signal in the time domain to estimate a delay profile.

Particularly, the MMP unit 18 executes the OMP method and estimates an impulse response by referring to the pilot signal of the first frame, and determines position information of the estimated impulse response (for example, information on a delay time or a preceding time from the main wave). The MMP unit 18 then executes the OMP method and refers to a pilot signal corresponding to the above-mentioned position information in the pilot signal in the second frame subsequent to the first frame, and estimates an impulse response to determine the position information on the estimated impulse response.

Furthermore, in estimation of an impulse response in the (L+1)th frame subsequent to the Lth frame (L is an integer greater than or equal to 2), the MMP unit 18 refers to a pilot signal which corresponds to the already determined position information in the Lth frame and is included in the pilot signal of the (L+1)th frame and estimates an impulse response. The MMP unit 18 then determines the position information on the estimated impulse response.

The MMP method is a technique in which the OMP method is executed, an impulse response is estimated by referring to a pilot signal within a limited range out of the pilot signals in the current frame, and the position information on the estimated impulse response is determined. The limited range corresponds to the position information on an impulse response which is determined in the estimation of an impulse response in the frame immediately preceding the current frame.

The FFT unit 19 performs the FFT processing on the impulse response (in other words, the delay profile) estimated by the MMP unit 18, converts the delay profile in the time domain into a delay profile in the frequency domain, and outputs the converted delay profile.

The propagation path compensation unit 20 refers to the delay profile in the frequency domain outputted by the FFT unit 19 with respect to the digital signal in the frequency domain outputted by the FFT unit 15, and estimates propagation path characteristics of a symbol (also called data symbol, data signal) which is not pilot symbol. The propagation path compensation unit 20 then performs compensation processing for removing propagation path characteristics from the data symbol based on the estimated propagation path characteristics, and outputs the data symbol to the upper application (not illustrated).

(Details of MMP Method)

Hereinafter, the details of the MMP method will be described. Estimation of an impulse response of a multipath propagation path is repeated frame by frame. Suppose that ith observation vector y is expressed by expression (28). The ith observation vector y corresponds to a signal in the time domain which is obtained by performing IFFT on a pilot signal extracted from signals in the frequency domain. The signals are obtained by performing FFT on signals (for example, OFDM signals) in the time domain in the ith frame received by the receiver 100 from a transmitter (not illustrated), for example. In other words, the pilot signal in the time domain in the ith frame which is outputted by the IFFT unit 17 is the N-dimensional observation vector y (that is, signal vector) in the time domain.

$$y^{(i)} = Xg^{(i)} + z^{(i)} \quad (28)$$

$$y^{(i)} = \begin{pmatrix} y_1^{(i)} \\ \vdots \\ y_n^{(i)} \\ \vdots \\ y_N^{(i)} \end{pmatrix} \quad (29)$$

As expressed by expression (29), $y^{(i)}$ in expression (28) is an N-dimensional observation vector. The N corresponds to the number of carriers of the OFDM as described above.

$$g^{(i)} = \begin{pmatrix} g_1^{(i)} \\ \vdots \\ g_k^{(i)} \\ \vdots \\ g_K^{(i)} \end{pmatrix} \quad (30)$$

As expressed by expression (3), $g^{(i)}$ in expression (28) is a K-dimensional impulse response vector. K indicates a time and the change 1, ... k, ... K indicates a change in time. The impulse response $g^{(i)}$ has a sparse property. The impulse response $g^{(i)}$ is a vector in which almost all elements are 0 except for several elements for which a pulse is present.

$$z^{(i)} = \begin{pmatrix} z_1^{(i)} \\ \vdots \\ z_n^{(i)} \\ \vdots \\ z_N^{(i)} \end{pmatrix} \quad (31)$$

Expression (31) is a vector that represents noise.

In the present embodiment, estimation of an impulse response of a multipass propagation path for the first (for example, the 0th) frame is made by the conventional OMP method.

Here, the MMP unit 18 sets the first frame number as expressed by the following expression (32).

$$i = 0 \quad (32)$$

The MMP unit 18 estimates an impulse response in the 0th frame shown below by conventional steps of the OMP method.

$$\hat{g}^{(0)}$$

Therefore, the number iterations of correlation calculation is K times. On the other hand, in the estimation for the subsequent frame, the MMP unit 18 performs correlation calculation based on the previous estimation result, thereby making it possible to significantly reduce the number iterations of correlation calculation to be performed. The steps for the estimation will be described in the following.

First, the initial frame detection (i=0) will be described. The MMP unit 18 performs the following correlation calculation on the first frame (i=0), and searches for a maximum of correlation calculation value, where t is a loop counter. Similarly to the OMP method, when the below-described update of a residual vector is completed, the MMP unit 18 increments the loop counter t by 1 according to expression (9) stated above.

$$in_t^{(i)} = \arg\max_{k \in S^{(i)}} |\langle r_{t-1}^{(i)}, x_k^{(i)} \rangle| \quad (33)$$

Here, $\langle x, y \rangle$ is the inner product of vectors x and y.

When t=1 in expression (33), the MMP unit 18 determines a first column number (element number) of the sensing matrix X, for which the inner product of the observation vector y and the column component x of the sensing matrix X has a maximum. The column number is 6 in the example of FIG. 1 and FIG. 3. It is to be noted that the left side of expression (33) corresponds to the left side of expression (10), that is, the element number $\lambda_t$.

Next, $S^{(i)}$ is defined as the set of integers from 1 to K excluding already identified (selected) integers below.

$$S^{(i)}$$

$$in_t^{(i)}$$

That is, $S^{(i)}$ is expressed by the following expression (34).

$$S^{(i)} = \{1, 2, \ldots, K\} - \{in_1^{(i)}, \ldots, in_t^{(i)}\} \quad (34)$$

The MMP unit 18 generates a new matrix with a column vector in the sensing matrix $X^{(i)}$.

$$in_t^{(0)}$$

$$X_{in_t}^{(0)}$$

$$X_{t-1}^{(0)}$$

The new matrix expressed by expression (35) is generated by connecting the column vector $x_{in_t}^{(0)}$ for the column $in_t^{(0)}$ to the right side of the provisional sensing matrix $X_{t-1}^{(0)}$.

$$X_t^{(i)} = [X_{t-1}^{(i)}, x_{in_t}^{(i)}] \quad (35)$$

The new matrix also called a provisional sensing matrix or a second matrix.

In the example of FIG. 1 and FIG. 3, when t is 1 in expression (35), the MMP unit 18 connects the column vector $x_6$ (subscript (i) is omitted) for the column number "6" in the sensing matrix X (subscript (i) is omitted) to the right side of 0 matrix, thereby generating a provisional sensing matrix $X_1$ (subscript (i) is omitted).

The set of search indices is expressed by the following expression (36).

$$In_t^{(i)} = In_{t-1}^{(i)} \cup in_t^{(i)} \quad (36)$$

The MMP unit 18 uses the set of search indices for the calculation in the estimation of an impulse response of a multipath propagation path in the subsequent (i+1)th frame. Each search index corresponds to a search element described in the OMP method.

The MMP unit 18 then determines a provisional estimated value of an impulse response by the least square method as expressed by the following expression (37).

$$\hat{h}_t^{(i)} = \underset{h}{\arg\min} \|r_{t-1}^{(i)} - X_t^{(i)} h\|^2 = X_t^{(i)+} r_{t-1}^{(i)} \quad (37)$$

Here, the following expression (38) in expression (37) is a t-dimensional column vector consisting of the values of the selected elements of the sparse vector.

$$h = \begin{pmatrix} h_1 \\ \vdots \\ h_t \end{pmatrix} \quad (38)$$

The following expression (39) in expression (37) is an estimated value, that is, a provisional impulse response vector.

$$\hat{h}_t^{(i)} = \begin{pmatrix} \hat{h}_1 \\ \vdots \\ \hat{h}_t \end{pmatrix} \quad (39)$$

The following matrix is the pseudo inverse matrix of the provisional sensing matrix $X_t^{(i)}$.

$$X_t^{(i)+}$$

$$X_t^{(i)}$$

That is, when t is 1 in expression (37), the MMP unit 18 estimates a provisional impulse response vector based on the provisional sensing matrix $X_1$ (hereinafter subscript (i) is omitted as appropriate) and the observation vector y (hereinafter subscript (i) is omitted as appropriate). So far, first processing has been described in which the correlation calculation (see expression (33)) is performed and a provisional impulse response vector is estimated (see expression (37)) in the case where the loop counter t is 1. That is, the first processing is the processing of performing the correlation calculation and estimating a provisional impulse response vector in the case where the loop counter t is 1.

When the loop counter t is 1, using expression (37), the MMP unit 18 determines a provisional impulse response vector which is obtained by multiplying the pseudo inverse matrix of the provisional sensing matrix $X_1$ by the observation vector y (that is, the residual vector $r_0$ (subscript (i) is omitted)).

The MMP unit 18 updates the residual vector using the estimated value as expressed by the following expression (40).

$$r_t^{(i)} = r_{t-1}^{(i)} - X_t^{(i)} \hat{h}_t^{(i)} \quad (40)$$

When the loop counter t is 1, the residual vector is an exclusion N-dimensional signal vector which is obtained by excluding already estimated provisional impulse responses from the observation vector y (that is, the residual vector $r_0$ (subscript (i) is omitted)), for example. The MMP unit 18 then increments the loop counter t by 1 according to expression (9).

Here, when the loop counter t is 2 in expression (33), the MMP unit 18 determines a column number (element number X) of the sensing matrix X (subscript (i) is omitted as appropriate), for which the inner product of the residual vector $r_1$ and the column component x of the sensing matrix X has a maximum. The column number is 12 in the example of FIG. 1 and FIG. 3.

When t is 2 in expression (35), the MMP unit 18 then generates a new provisional sensing matrix $X_2$ by connecting the column vector $x_{12}$ (subscript (i) is omitted as appropriate) for the determined column number (for example, 12) in the sensing matrix X to the right side of the provisional sensing matrix $X_1$ (subscript (i) is omitted as appropriate).

That is, when t is 2 in expression (37), the MMP unit 18 estimates a provisional impulse response vector based on the pseudo inverse matrix of the provisional sensing matrix $X_2$ and the residual vector $r_1$ (subscript (i) is omitted as appropriate).

So far, second processing has been described in which the correlation calculation (see expression (33)) is performed, the residual vector is updated (see expression (40)), and the loop counter t is incremented by 1 in the case where the loop counter t is 2 or greater. That is, the second processing is the processing of performing the correlation computation, updating the residual vector, and incrementing the loop counter t by 1 in the case where the loop counter t is 2 or greater.

The MMP unit 18 estimates a provisional impulse response vector which is obtained by multiplying the pseudo inverse matrix of the provisional sensing matrix by the residual vector in the second processing using expression (37).

The MMP unit 18 repeatedly executes the second processing.

The MMP unit 18 repeats the processing from updating the loop counter to updating the residual vector until the magnitude of the residual vector becomes less than a predetermined threshold value (see expression (17)) or the loop counter t reaches K, that is, t=K is satisfied. In other words, the MMP unit 18 stops the repeated execution of the second processing when the number of execution iterations of the first and second processing reaches K or the magnitude of the residual vector becomes greater than or equal to a predetermined magnitude.

By repeating the above processing, it is possible to detect all peak values and estimate an impulse response. Finally, the MMP unit 18 estimates an impulse response by the following expression (41).

$$\hat{g}^{(i)} = (e_{in_1}^{(i)}, e_{in_2}^{(i)}, \ldots, e_{in_t}^{(i)}) \hat{h}_t^{(i)} \quad (41)$$

The MMP unit 18 estimates an impulse response by expression (41) based on the determined column number and the estimated provisional impulse response vector. The determined column number is given by the element e (subscript is omitted) in the parenthesis of expression (41), and the provisional impulse response is given by the h (subscript is omitted) in expression (41).

As described above, in the example of FIG. 1 and FIG. 3, the part in the parenthesis in expression (41) is ($e_6, e_{12}$). In the example of FIG. 1 and FIG. 3, the subscripts 6 and 12 are the column numbers (6, 12) which are determined (selected) in the sensing matrix X.

Now, the estimation of an impulse response of a multipath propagation path for the first (for example, the 0th) frame based on the conventional OMP method is completed. In the example of FIG. 1 and FIG. 3, the MMP unit 18 estimates that two impulse responses (see symbol P6 and symbol P12) of delay wave are at the time positions for which k is 6, 12.

The MMP unit 18, after determining an impulse response for the 0th frame, calculates the search index for obtaining an impulse response for the subsequent frame (the first or subsequent frame) by the following expression (42) and expression (43). The search index is an example of the position information on an impulse response (refer to the description of the MMP unit 18 of FIG. 4). First, the impulse response $g^{(i)'}(k)$ for search index is defined by the following expression (42).

$$g^{(i)'}(k) = \frac{1}{2}g^{(i)}(k-1) + \frac{\sqrt{2}}{2}g^{(i)}(k) + \frac{1}{2}g^{(i)}(k+1) \quad (42)$$

By expression (42), adjacent elements (time (k−1) and time (k+1)) to the position (time k) of a non-zero element of an impulse response are also non-zero. It is to be noted that the coefficient of g (subscript (i) is omitted) is an example.

Next, the MMP unit 18 determines a search index by the following expression (43).

$$in^{(i)}(k) = \begin{cases} 1, & |g^{(i)'}(k)| > \epsilon \\ 0, & |g^{(i)'}(k)| \le \epsilon \end{cases} \quad (43)$$

Here, $\epsilon$ is a non-negative significantly small value which is defined experimentally.

FIGS. 5A and 5B are each an exemplary diagram schematically illustrating a search index. FIG. 5A is an exemplary graph illustrating a distribution of impulse responses on the time axis. The horizontal axis indicates time and the vertical axis indicates the power of an estimated impulse response. The horizontal axis also indicates vector v at a peak position of an impulse response.

FIG. 5B schematically illustrates a change in time of an estimated impulse response and a vector at a peak position.

In the example of FIG. 5A, it is estimated that two impulse responses (see symbol P6 and symbol P12) of delay wave are at the time positions for which k is 6, 12. Furthermore, suppose that it is estimated that a power different from the two delay impulse responses is at the time position for which k is 16 (see symbol P16). The power component indicated by the symbol P16 is an error component.

Then, a change in the power of an estimated impulse response in relation to a change of k in time is indicated by a solid line X1 of a symbol B1. Also, in the solid line X1, as denoted by "v location" in relation to the time change (k=1, 2, 3, . . . ), a number sequence is illustrated in which a power component exceeding 0 is represented by 1 and other components are represented by 0. In the example of the solid line X1 of the symbol B1, the first number sequence is [00000100000100010]. That is, the first number sequence is such that the 6th (k=6), 12th (k=12), and 16th (k=16) numbers are 1 and the numbers except for the 6th, 12th, and 16th numbers are 0.

A solid line X2 of a symbol B2 indicates the change in the impulse response g for search index when k, which changes from 1 to 16, is substituted into expression (42). The impulse response g for search index is given by the left side of expression (42).

Then, in the solid line X2, as denoted by "v location" in relation to the time change (k=1, 2, 3, . . . ), a number sequence is illustrated in which a power component exceeding 0 is represented by 1 and other components are represented by 0. In the example of the solid line X2 of the symbol B2, the second number sequence is [00001110001110111]. That is, the second number sequence is such that the 5th, 6th, 7th (k=5, 6, 7), the 11th, 12th, 13th (k=11, 12, 13), the 15th, 16th, 17th (k=15, 16, 17) numbers are 1, and the numbers except for the 5th, 6th, 7th, 11th, 12th, 13th, 15th, 16th, 17th numbers are 0.

Here, a threshold value th indicated by a dotted line of the symbol B2 is assumed to be the threshold value c in expression (43). Here, for the solid line X2 that represents a change in the impulse response g for search index, a symbol X3 indicates an impulse response g for search index after any impulse response for search index less than or equal to the threshold value th at time k is set to 0.

As expressed by expression (43), the search index in(k) is set to 1 for an impulse response g(k) for search index, in which the impulse response exceeds the threshold value th (equivalent to the threshold values in expression (43)). As expressed by expression (43), the search index in(k) is set to 0 for an impulse response g(k) for search index, in which the impulse response is less than or equal to the threshold value th.

Then, the number sequence of search index is [00001110001110000]. The second number sequence is such that the 5th, 6th, 7th (k=5, 6, 7), the 11th, 12th, 13th (k=11, 12, 13) numbers are 1, and the numbers except for the 5th, 6th, 7th, 11th, 12th, 13th numbers are 0.

In the example of FIG. 5, the search index obtained by expression (42), expression (43) indicates the time position for which k is 5 (see symbol P5), k is 6 (see symbol P6), and k is 7 (see symbol P7). In addition, in the example of FIG. 5, the search index indicates the time position for which k is 11 (see symbol P11), k is 12 (see symbol P12), and k is 13 (see symbol P13).

Suppose i=0. The search index $in^{(0)}(k)$ is used for estimation of an impulse response in the first frame. As expressed by the above-mentioned number sequence of search indices, each search index (k is 15, 16, 17) of an error component is removed by expression (43), and thus a signal component near an error component is not used for estimation of an impulse response in the 0th or subsequent frame, thereby making it possible to reduce the amount of calculation.

The position information (refer to the description of the MMP unit 18 of FIG. 4) on an impulse response is the following information. That is, the position information is time dimension information which corresponds to the first column number ($in_t$ (subscript (i) is omitted)) of the sensing matrix X and the second column number prior to and subsequent to the first column number, the first and second column numbers being described with reference to expression (33) and determined by executing the first processing for estimation of an impulse response in the first (the 0th) frame and further executing the second processing repeatedly. In the example of FIG. 5, the first column numbers are 6, 12, 16 (as time dimension information, k=6, 12, 16). The second column numbers are 5, 7, 11, 13, 15, 17 (as time dimension information, k=5, 7, 11, 13, 15, 17).

As expressed by expression (42), expression (43), when the magnitude of an impulse response (g(k), subscript (i)' is omitted) in time dimension corresponding to one of the first column numbers and second column numbers is greater than or equal to a predetermined threshold value (for example, the threshold value ε in expression (43)), the MMP unit 18 determines that time dimension information corresponding to the one of the first column numbers and second column numbers is position information on the impulse response.

In the example of FIG. 5, the impulse responses (g(k), hereinafter subscript (i)' is omitted as appropriate) in time dimension each corresponding to one of the first column numbers and second column numbers and having a predetermined threshold value (for example, the threshold value ε in expression (43)) or greater are as follows. That is, those impulse responses are g(5), g(6), g(7), g(11), g(12), and g(13). The time dimension information corresponding to the first column numbers and second column numbers and having a magnitude of the impulse response (g(k)) greater than or equal to a predetermined threshold value is given by k=5, 6, 7, 11, 12, 13 which are the time dimension information on g(5), g(6), g(7), g(11), g(12), and g(13).

Next, the MMP unit 18 determines a threshold value θ(i) by the following expression (44), the threshold value being referenced when an impulse response in the first frame is estimated. The threshold value indicates the average of the power components of the impulse response for search index expressed by expression (42).

$$\theta^{(i)} = \sqrt{\frac{1}{K}\sum_{k=1}^{K}|g^{(i)\prime}(k)|^2} \qquad (44)$$

In the above description, estimation of an impulse response in the 0th frame using the OMP method is completed.

Next, estimation of an impulse response in the first frame is made using the MMP method. At this point, the MMP unit 18 increments the counter i for frame number by 1 according to the following expression (45).

$$i=i+1 \qquad (45)$$

Because of the condition of a sparse vector, almost all elements of an estimated value of the impulse response below are 0.

$$\hat{g}^{(i)}$$

As described above, the peak position of an impulse response has such characteristics that a change of the peak position in time is relatively slow. That is, due to the characteristics of a propagation path, the position of a non-zero element slowly changes and does not change rapidly.

Thus, in estimation of an impulse response of a multipath propagation path for the subsequent frame, the MMP unit 18 estimates an impulse response in the search range including the peak position of the impulse response estimated last time and its periphery. By narrowing the search range in this manner, it is possible to significantly reduce the number iterations of correlation calculation.

The MMP unit 18 uses the vectors in expressions (28) to (31) to search for a maximum of correlation calculation value by the following expression (46) instead of expression (33).

$$in_t^{(i)} = \arg\max_{k \in \hat{S}^{(i)}} |(r_{t-1}^{(i)}, x_k^{(i)})| \qquad (46)$$

Here, the difference between expression (46) and expression (33) is that the search range is defined by the following expression (47).

$$\hat{S}^{(i)}\{k|(k=1,2,\ldots,K)\cap(in^{(i-1)}(k)=1)\}-\{in_1^{(i)},\ldots,in_t^{(i)}\} \qquad (47)$$

Here, the below expression (48) in expression (47) indicates the set of k which is included in k=1, 2, ... K and satisfies the below expression (49) in expression (47).

$$\{k|(k=1,2,\ldots K)\cap(in^{(i-1)}(k)=1)\} \qquad (48)$$

$$in^{(i-1)}(k)=1 \qquad (49)$$

In the example of the FIG. 5, k is 5, 6, 7, 11, 12, 13. In the first processing (the loop counter t=1) for estimation of an impulse response in the second (0th or subsequent) frame, the MMP unit 18 determines a column number of the sensing matrix X, for which the inner product of the observation vector y corresponding to the position information on an impulse response and the column component of the sensing matrix X has a maximum. In the example of FIG. 5, the observation vector y corresponding to the position information on an impulse response represents the power for k at 5, 6, 7, 11, 12, 13. The column number of the sensing matrix is 6.

In the second processing (the loop counter t is 2 or greater) for estimation of an impulse response in the second frame, the MMP unit 18 determines a column number of the sensing matrix X, for which the inner product of the residual vector r corresponding to the position information on an impulse response and the column component of the sensing matrix X has a maximum. In the example of FIG. 5, the residual vector corresponding to the position information on an impulse response represents the power for k at 5, 7, 11, 12, 13 excluding k at 6 mentioned above.

In the time of search, the MMP unit 18 increments the loop counter t by 1 according to the above stated expression (9).

The MMP unit 18 then performs the calculation described with reference to expression (46), expressions (35) to (40), and estimates an impulse response by expression (41). In the estimation, the calculation described with reference to expressions (35) to (40), expression (46), expression (47) is repeatedly performed until the magnitude of a residual vector described with reference to expressions (40) becomes less than the threshold value $\theta^{(i-1)}$ calculated in the previous frame as expressed by the below expression (50) or the number of repeat t reaches P times. The P indicates the number of k that satisfies expression (49) in expression (48).

$$\|r_t^{(i)}\|2 > \theta^{(i-1)} \qquad (50)$$

The MMP unit 18 may detect all peak values and estimate an impulse response by repeating the above processing. It is to be noted that the MMP unit 18 estimates an impulse response by expression (41).

Subsequently, the MMP unit 18 determines a search index for obtaining an impulse response for the first or subsequent frame. First, the MMP unit 18 calculates the following by expression (42) described above.

$$g^{(i)\prime}(k)$$

In addition, the MMP unit 18 calculates the threshold value $\theta^{(i)}$ by expression (44) described above.

Next, the MMP unit 18 determines a search index.

Here, almost all elements of the below-mentioned impulse response for search index are 0 due to the condition of a sparse vector.

$$g^{(i)\prime\prime}$$

Therefore, the amplitude of a path with a large amplitude has a larger value than the threshold value $\theta^{(i)}$.

The MMP unit 18 determines the following by the expression (51) below.

$g^{(i)''}$ $$g^{(i)''}(k) = \begin{cases} g^{(i)'}(k), & |g^{(i)'}(k)| > \theta^{(i-1)} \\ 0, & |g^{(i)'}(k)| \le \theta^{(i-1)} \end{cases} \quad (51)$$

The MMP unit 18 then determines a search index of a new non-zero impulse response position by the following expression (52).

$$in^{(i)}(k) = \begin{cases} 1, & |g^{(i)''}(k)| > \theta^{(i-1)} \\ 0, & |g^{(i)''}(k)| \le \theta^{(i-1)} \end{cases} \quad (52)$$

Estimation of an impulse response for the second or subsequent frame is made by the MMP method described above. Particularly, in the estimation of an impulse response in the (L+1) frame subsequent to the Lth frame (L is an integer greater than or equal to 2), the position information (refer to the description of the MMP unit 18 of FIG. 4) on the impulse response is the following.

That is, the position information is time dimension information which corresponds to the first column number of the sensing matrix and the second column number prior to and subsequent to the first column number, the first and second column numbers being determined by executing the first processing (the loop counter t=1) for estimation of an impulse response in the Lth frame and further executing the second processing (the loop counter t is 2 or greater) repeatedly.

In the first processing for estimation of an impulse response in the (L+1)th frame, the MMP unit 18 determines a column number of the sensing matrix, for which the inner product of the observation vector y corresponding to the position information on the impulse response and the column component of the sensing matrix has a maximum. Furthermore, in the second processing for estimation of an impulse response in the (L+1)th frame, the MMP unit 18 determines a column number of the sensing matrix, for which the inner product of the residual vector corresponding to the position information on the impulse response and the column component of the sensing matrix has a maximum.

(Flow of Estimation Processing of Impulse Response)

Figure 6:
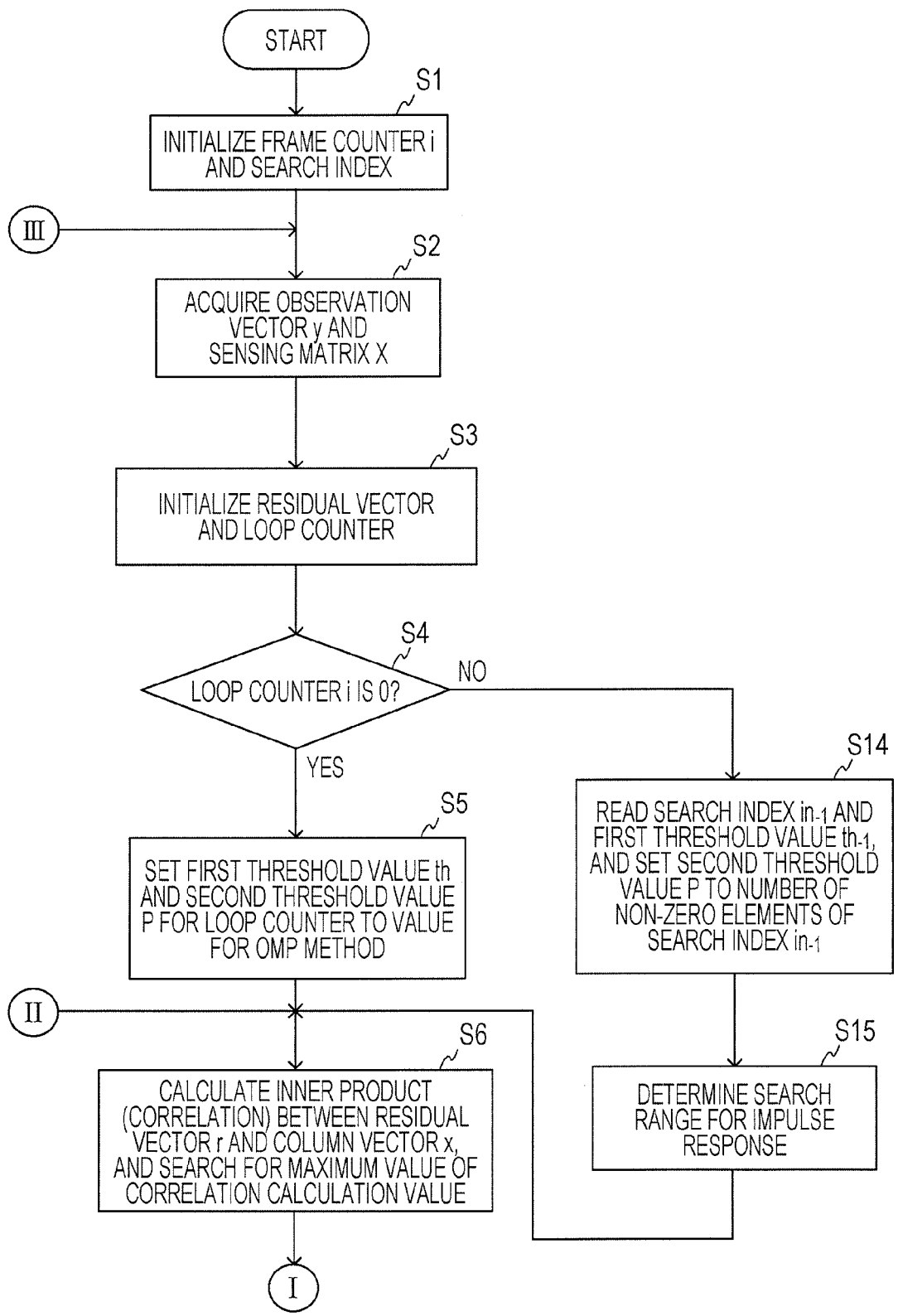
FIG. 6 is a first flow diagram illustrating a flow of processing for estimating an impulse response using the MMP method in the present embodiment.
Figure 7:
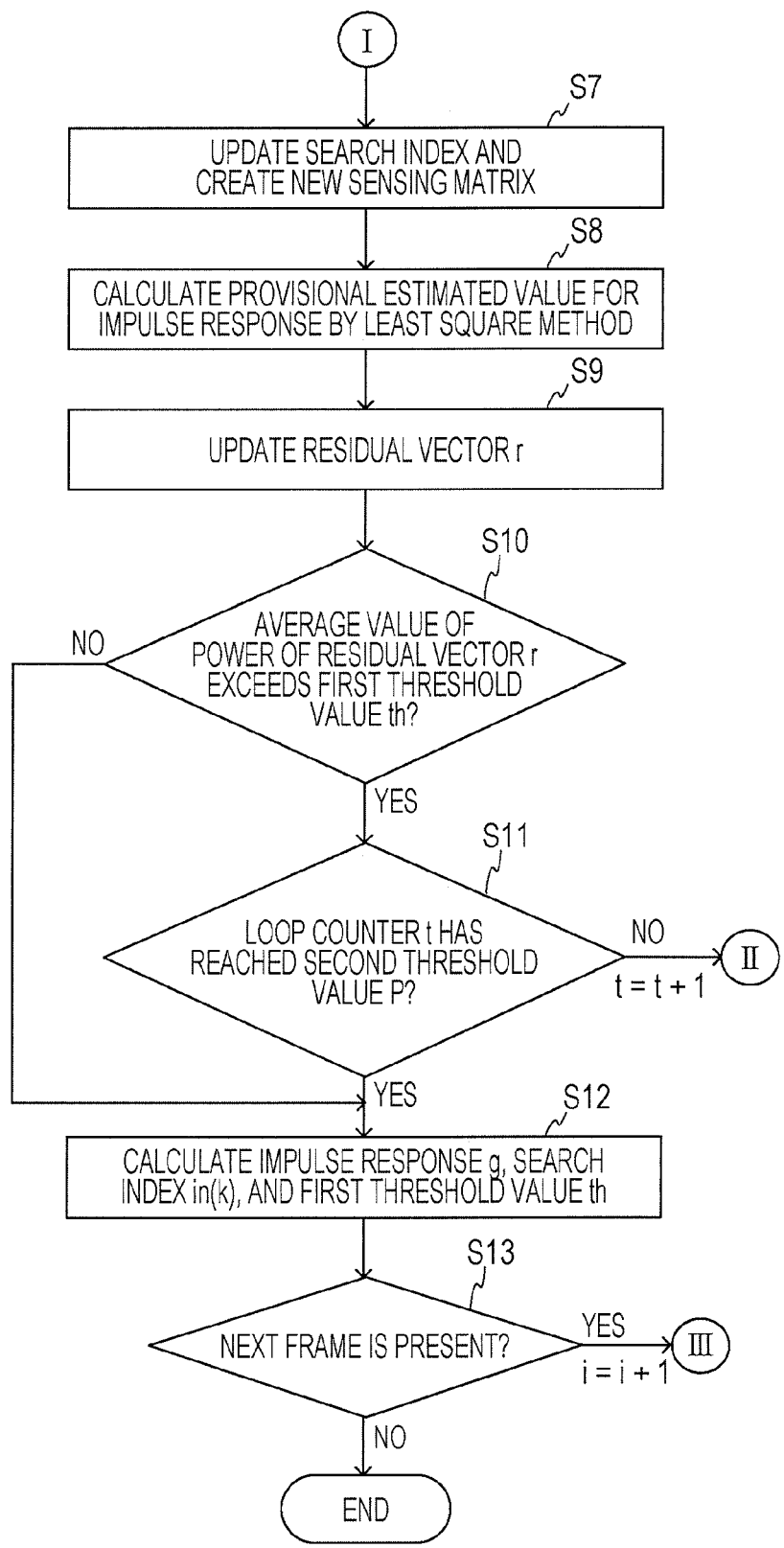
FIG. 7 is a second flow diagram illustrating a flow of processing for estimating an impulse response using the MMP method in the present embodiment.

FIG. 6 and FIG. 7 are first and second flow diagrams each illustrating a flow of processing for estimating an impulse response using the MMP method in the present embodiment.

Operation S1: the MMP unit 18 initializes various variables (first initialization). The variables initialized by the MMP unit 18 in the first initialization are the frame counter i and the set of search indices expressed by expression (36).

Specifically, the MMP unit 18 sets i to 0 as expressed by expression (32). Furthermore, the MMP unit 18 initializes the set of search indices as expressed by expression (36), that is, defines the set as it, (empty vector).

Operation S2: the MMP unit 18 acquires the observation vector y and the sensing matrix X in the ith frame. The observation vector y is the observation vector as expressed by expression (28). The sensing matrix X is the matrix as expressed by expression (5).

Operation S3: the MMP unit 18 initializes various variables (second initialization). The variables initialized by the MMP unit 18 in the second initialization are the residual vector r and the loop counter t. The MMP unit 18 sets the loop counter t to 1, and substitutes the observation vector for the residual vector as expressed by the following expression (53).

$$r_0^{(i)} = y^{(i)} \quad (53)$$

Operation S4: the MMP unit 18 determines whether or not the frame inputted by the operation S1 is the first (the 0th) frame. Specifically, the MMP unit 18 determines whether or not the frame counter i is 0. When the frame inputted by the operation S1 is the first (the 0th) frame (the operation S4), the flow proceeds to the operation S5.

Operation S5: the MMP unit 18 sets a first threshold value th for loop counter, a second threshold value P to respective values for the OMP method. The MMP unit 18 sets the first threshold value th for loop counter to a threshold value $\epsilon$ (see expression (17) for $\epsilon$), and sets the second threshold value P to K (see expression (3) for K).

Operation S6: the MMP unit 18 calculates the inner product of the residual vector r and the column vector x (performs correlation calculation) as expressed by expression (33) for the first frame (i is 0) or as expressed by expression (46) for the subsequent (i is 1 or greater) frame, and searches for a maximum of correlation calculation value. In other words, the MMP unit 18 searches for a search index (time k) of a peak position at which the inner product of the residual vector r and the column vector x has a maximum.

Operation S7 of FIG. 7: the MMP unit 18 updates the search index identified in the operation S6, and further connects a column component in the sensing matrix X to a provisional sensing matrix, the column component corresponding to the search index identified in the operation S6, thereby generating a new provisional sensing matrix. Specifically, the MMP unit 18 updates the search index as expressed by expression (36). The MMP unit 18 then generates a provisional sensing matrix $X_t$ (subscript (i) is omitted) as expressed by expression (35).

Operation S8: the MMP unit 18 calculates a provisional estimated value of an impulse response by the least square method as expressed by expression (37).

Operation S9: the MMP unit 18 updates the residual vector r as expressed by expression (40).

Operation S10: the MMP unit 18 determines whether or not the average of the power of the residual vector r exceeds the defined first threshold value th. Specifically, in the operation S10, when an impulse response for the first (i=0) frame is calculated and expression (17) is not satisfied, the MMP unit 18 determines YES in the operation S10 and the flow proceeds to the operation S11. Also, in the operation S10, when an impulse response for a frame (i=1, 2 . . . ) subsequent to the first frame is calculated and expression (50) is not satisfied, the MMP unit 18 determines YES in the operation S10 and the flow proceeds to the operation S11.

Operation S11: the MMP unit 18 determines whether or not the loop counter t has reached the second threshold value P. When the loop counter t has not reached P (NO in the operation S11), the loop counter t is incremented as expressed by expression (9) and the flow returns to the operation S6 of FIG. 6. When the loop counter t has reached P (YES in the operation S11), the flow proceeds to the operation S12. In the operation S10, when an impulse response for the first (i=0) frame is calculated and expression (17) is satisfied, the MMP unit 18 determines NO in the operation S10 and the flow proceeds to the operation S12. Also, in the operation S10, when an impulse response is calculated for a frame (i=1, 2, ...) subsequent to the first frame and expression (50) is satisfied, the MMP unit 18 determines NO in the operation S10 and the flow proceeds to the operation S12.

Operation S12: the MMP unit 18 calculates the impulse response g, the search index in, and the first threshold value th, and writes a result of the calculation in a memory (not illustrated). Specifically, the MMP unit 18 calculates the impulse response by expression (41).

In the first case where an impulse response is calculated for the first (i=0) frame, the MMP unit 18 determines a search index by expression (42), expression (43). In the first case described above, the MMP unit 18 calculates the first threshold value by expression (44).

In the second case where an impulse response is calculated for a frame (i=1, 2 ...) subsequent to the first frame, the MMP unit 18 determines a search index by expression (42), expression (51), and expression (52). In the second case described above, the MMP unit 18 calculates the first threshold value by expression (44).

The MMP unit 18 then adds the determined search index to the set of search indices as expressed by expression (36). It is to be noted that the MMP unit 18 may store the search index determined for each frame into the memory with the search index being associated with a number (for example, the counter i of the frame number) that identifies the frame.

Operation S13: the MMP unit 18 determines whether or not a subsequent frame is present. When no subsequent frame is present (NO in the operation S13), the processing is terminated. When a subsequent frame is present (YES in the operation S13), the frame counter i is incremented as expressed by expression (45), and the flow returns to the operation S2 of FIG. 6. Subsequently, the MMP unit 18 performs the processing in the operations S2 to S4, and because the frame counter i is not 0 (NO in the operation S4), the flow returns to the operation S14.

Operation S14: the MMP unit 18 reads a search index $in_{-1}$ determined for the (i−1)th frame and the first threshold value $th_{-1}$ from the memory, and further sets the second threshold value P to the number of non-zero elements of the search index $in_{-1}$. The number of non-zero elements of the search index $in_{-1}$ is the number of k that satisfies expression (49) in expression (47) as described above.

Operation S15: the MMP unit 18 determines a search range for an impulse response where the search index $in_{-1}$ read in the operation S14 serves as k that indicates the search range in expression (46). Subsequently, the flow proceeds to the operation S6.

The MMP unit 18 described above repeatedly performs the processing in the operations S2 to S13 and estimates an impulse response in each frame.

Figure 8:
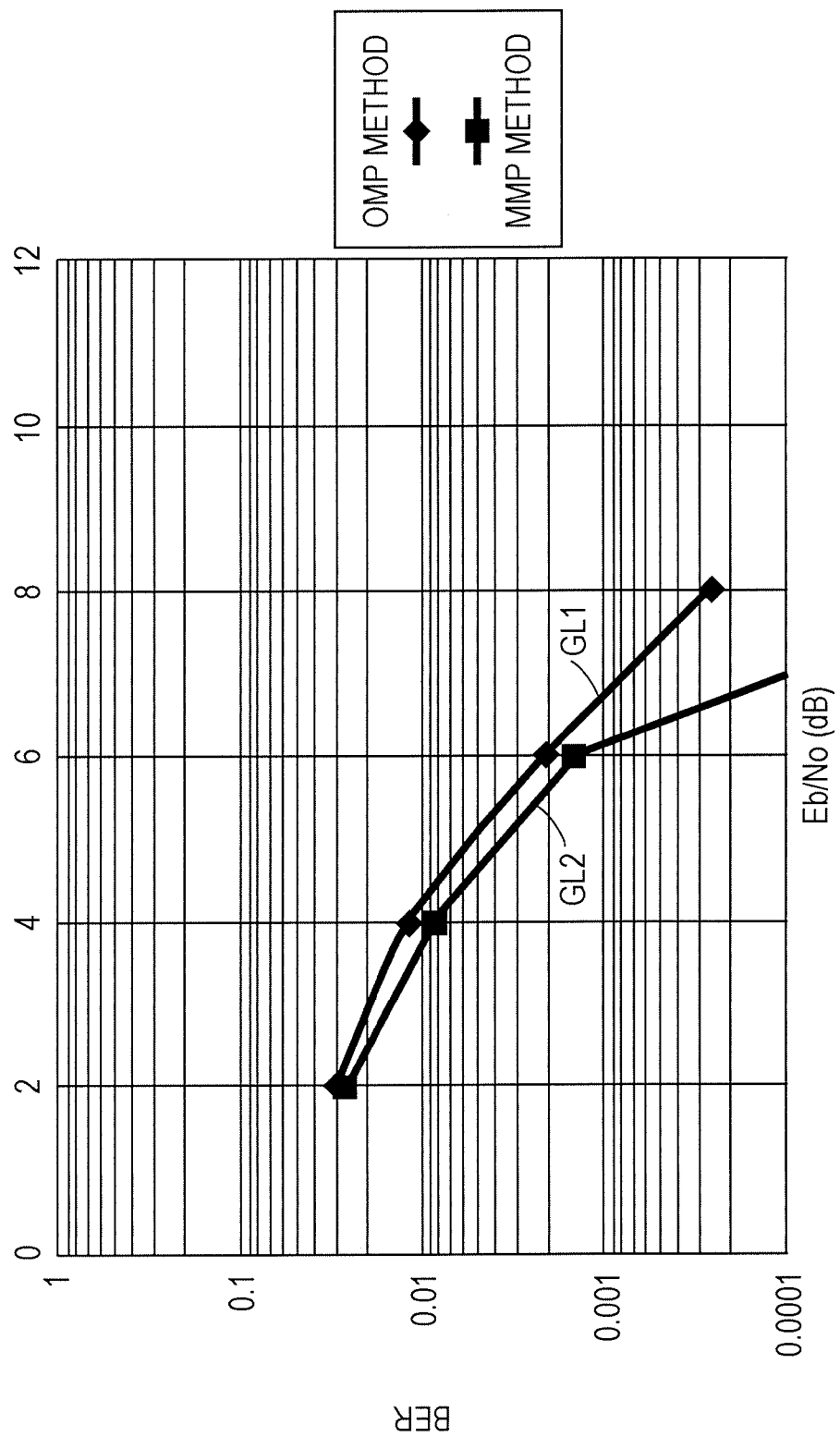
FIG. 8 is graph illustrating the bit error rate characteristics in the case where a receiver described in a first embodiment receives signals.

FIG. 8 is graph illustrating the bit error rate characteristics in the case where the receiver 100 described in the first embodiment receives signals. In FIG. 8, the vertical axis indicates bit error rate (BER). The horizontal axis indicates bit energy-to-noise power density ratio (Eb/No).

A graph line GL1 indicates bit error rate characteristics in the case where an impulse response is calculated using the conventional OMP method. A graph line GL2 indicates bit error rate characteristics in the case where an impulse response is calculated using the MMP method described in the present embodiment.

As illustrated in FIG. 8, in the case where an impulse response is calculated using the MMP method described in the present embodiment, almost equivalent bit error rate is obtained compared with the case where an impulse response is calculated using the conventional OMP method.

FIG. 9 is a table illustrating the specification of a system which is used for analysis of the bit error rate characteristics described with reference to FIG. 8. In the table of FIG. 9, mode3 of integrated services digital broadcasting (ISDB)-T is used as a system model.

The table of FIG. 9 indicates the following specifications. The noise type is additive white gaussian noise (AWGN), and the modulation type is quadrature phase shift keying (QPSK). The data subcarrier is 3744, the pilot subcarrier is 1872, and the FFT size is 8192. The GI ratio is ⅛, and the path model is $\delta(t)+\frac{1}{2}\delta(t-1)$.

Figure 10:
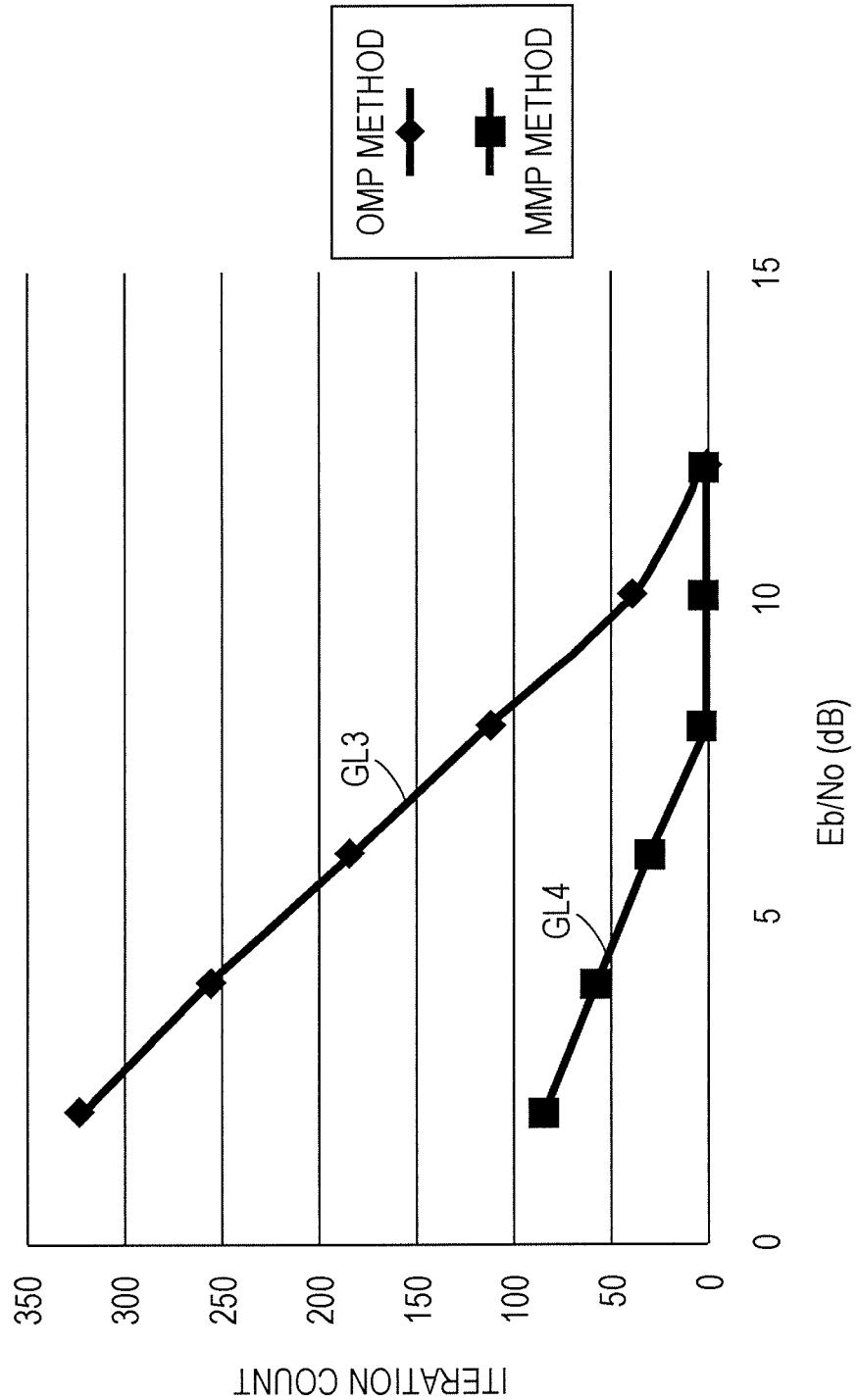
FIG. 10 is a graph schematically illustrating an amount of calculation in the case where the receiver described in the first embodiment receives signals.

FIG. 10 is a graph schematically illustrating a calculation amount in the case where the receiver 100 described in the first embodiment receives signals. In FIG. 10, the vertical axis indicates amount of calculation (iteration count). The horizontal axis indicates bit energy-to-noise power density ratio (Eb/No).

A graph line GL3 indicates the iteration count in the case where an impulse response is calculated using the conventional OMP method. A graph line GL4 indicates the iteration count in the case where an impulse response is calculated using the MMP method described in the present embodiment.

As illustrated in FIG. 10, in the case where an impulse response is calculated using the MMP method described in the present embodiment, the iteration count may be significantly reduced compared with the case where an impulse response is calculated using the conventional OMP method.

Second Embodiment

The receiver 100 in the first embodiment calculates an impulse response for the first (the 0th) frame using the conventional OMP method. By taking advantage of the characteristics that a change of the peak position of an impulse response in time is relatively slow, the receiver 100 calculates an impulse response for a subsequent (the first or subsequent) frame using the MMP method.

However, when a propagation path changes rapidly due to shadowing or the like, the peak position of an impulse response in the current frame may occur at a location apart from the peak position of an impulse response in the previous frame. Consequently, a peak at a location apart from the peak position of an impulse response in the previous frame may not be identified by the MMP method described in the present embodiment.

Thus, the OMP method is used for every predetermined number F (F is an integer greater than or equal to 2) of frames to identify the peak position of an impulse response, and the MMP method is used for other frames, thereby making it possible to cope with a rapid change of a propagation path.

That is, the MMP unit 18 makes estimation of an impulse response for the frames having a predetermined interval in continuous frames, the estimation having been made for the first frame. For the frames having a predetermined interval therebetween, the MMP unit 18 estimates an impulse response from a pilot signal corresponding to the position information which is already calculated for the immediately preceding frame, and determines the position information on the estimated impulse response.

Specifically, when the frame counter i is divisible by a predetermined number (for example, 5, 10, 100), an impulse response is calculated for the ith frame using the conventional OMP method. When the frame counter i is indivisible by the predetermined number, an impulse response is calculated for the ith frame using the MMP method.

In the example of FIG. 6, the MMP unit 18 determines whether or not the frame counter i is divisible by a predetermined number. When the frame counter i is divisible by the predetermined number, the MMP unit 18 determines YES in the operation S4, and the flow proceeds to the operation S5. On the other hand, when the frame counter i is indivisible by the predetermined number, the MMP unit 18 determines NO in the operation S4, and the flow proceeds to the operation S14.

In this manner, an impulse response is calculated by using the OMP method periodically and a search index is determined, and thus even when a propagation path changes rapidly due to shadowing or the like, an impulse response may be estimated with high accuracy.

OTHER EMBODIMENTS

It is to be noted that the observation vector y may be any one of an estimated value for a frequency response which is derived by using a pilot signal and an estimated value of an impulse response which is determined by performing the inverse Fourier transformation on a frequency response.

The estimated value of frequency response is a provisional frequency response estimation value which is estimated by referring to scattered pilots (SP) included in received signals. The scattered pilots are pilot symbols which are scattered and disposed in the frequency direction and the time direction.

Figure 11:
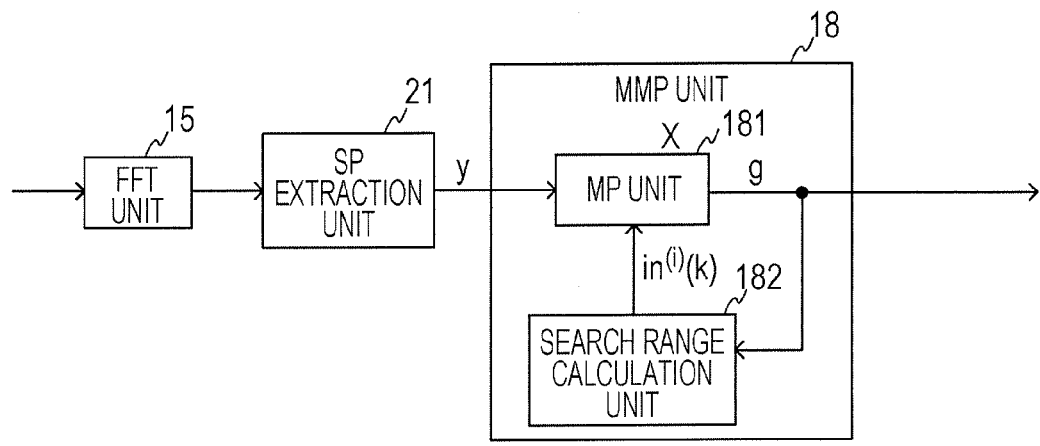
FIG. 11 is an exemplary block diagram illustrating a block that outputs observation vector y and MMP unit in the case where the observation vector y is an estimated value of a frequency response which is derived by using a pilot signal.

FIG. 11 is an exemplary block diagram illustrating a block that outputs observation vector y and the MMP unit 18 in the case where the observation vector y is an estimated value of a frequency response which is derived by using a pilot signal.

The SP extraction unit 21 extracts the SP which is included in the digital signals for one frame outputted by the FFT unit 15 and calculates a provisional frequency response estimation value. In the example of FIG. 11, the provisional frequency response estimation value gives the observation vector y.

An MP unit 181 of the MMP unit 18 applies the OMP method, for example, to the 0th frame (i=0) and estimates an impulse response g using the sensing matrix X. As described in the first embodiment, a search range calculation unit 182 refers to the impulse response g and determines a search index ($in^{(i)}(k)$). For a frame subsequent to the 0th frame, as described in the first embodiment, the MP unit 181 refers to the search index obtained for the previous frame and estimates an impulse response g by using the sensing matrix X.

Figure 12:
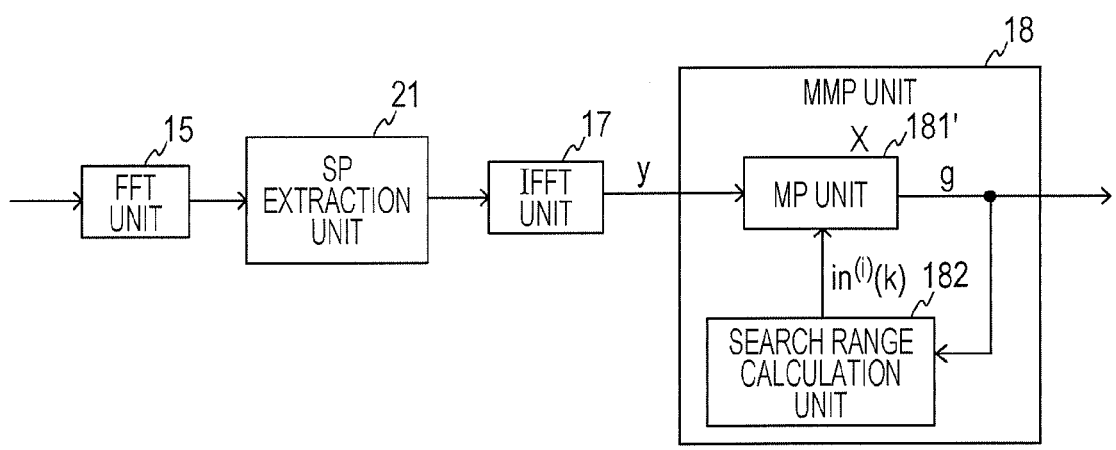
FIG. 12 is an exemplary diagram illustrating a block that outputs observation vector y and the MMP unit in the case where the observation vector y is an estimated value of an impulse response which is obtained by performing the inverse Fourier transformation on a frequency response.

FIG. 12 is an exemplary diagram illustrating a block that outputs observation vector y and the MMP unit 18 in the case where the observation vector y is an estimated value of an impulse response which is obtained by performing the inverse Fourier transformation on a frequency response.

An IFFF unit 17 performs IFFT on a provisional frequency response estimation value which is calculated by the SP extraction unit 21 and calculates a provisional estimated value of an impulse response.

An MP unit 181' of the MMP unit 18 applies the OMP method, for example, to the 0th frame (i=0) and estimates an impulse response g using the sensing matrix X. For a frame subsequent to the 0th frame, as described in the first embodiment, the MP unit 181' refers to the search index obtained for the previous frame and estimates an impulse response g by using the sensing matrix X. It is to be noted that the sensing matrix X is a matrix including an expectation value of the estimated impulse response which is obtained when actual impulse response g is estimated by using SR As described in the first embodiment, the search range calculation unit 182 refers to the impulse response g and determines the search index ($in^{(i)}(k)$).

With the configuration of FIG. 12, when the search range calculation unit 182 calculates a search range, the search range may be narrowed by using not only the impulse response g but also a provisional estimated value y of an impulse response. That is, an impulse response g is estimated by searching the time k near the provisional estimated value y of an impulse response, and thus the search range for the impulse response g may be narrowed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiver for receiving a frame including a pilot signal and a data signal, referring to an impulse response of a propagation path estimated from the pilot signal, and performing compensation processing on the data signal, the receiver comprising:

an extractor configured to extract the pilot signal of the frame; and an estimator configured to execute orthogonal matching pursuit (OMP) method which is a decoding algorithm for compressive sensing and to estimate the impulse response from the pilot signal, wherein the estimator refers to a pilot signal of a first frame, estimates an impulse response, determines position information on the estimated impulse response, refers to a pilot signal corresponding to the determined position information, of a second frame subsequent to the first frame, estimates an impulse response, and determines position information on the estimated impulse response;

wherein each of the pilot signal is an N-dimensional signal vector in a time domain, wherein the estimator has a first matrix with N rows and K columns that represents a transformation between the N-dimensional signal vector and a K-dimensional impulse response vector indicating a time position of the impulse response, in execution of the OMP method, wherein the estimator executes first processing including:
determining a column number of the first matrix, for which an inner product of the N-dimensional signal vector and a column component of the first matrix has a maximum,
connecting a column vector for the column number in the first matrix to right side of 0 matrix so as to generate a second matrix, and
estimating a provisional impulse response vector based on the second matrix and the N-dimensional signal vector, wherein the estimator repeatedly executes second processing including:
determining a column number of the first matrix, for which an inner product of an exclusion N-dimensional signal vector and a column component of the first matrix has a maximum, the exclusion N-dimensional signal vector being obtained by excluding the already estimated provisional impulse response from the N-dimensional signal vector, connecting a column vector for the column number in the first matrix to right side of the second matrix so as to generate a new second matrix, and estimating a provisional impulse response vector based on the new second matrix and the exclusion N-dimensional signal vector, wherein the estimator estimates an impulse response based on the column number determined in the second processing and the provisional impulse response vector estimated in the second processing, and wherein each of N and K is an integer greater than or equal to 1.

2. The receiver according to claim 1, wherein, for estimation of an impulse response in (L+1)th frame subsequent to Lth frame, the estimator estimates the impulse response from a pilot signal corresponding to the already determined position information in the Lth frame, and determines position information on the estimated impulse response, and wherein L is an integer greater than or equal to 2.

3. The receiver according to claim 1, wherein the position information on the impulse response is time dimension information which corresponds to a first column number of the first matrix and a second column number prior to and subsequent to the first column number, the first and second column numbers being determined by executing the first processing and further executing the second processing repeatedly for estimation of an impulse response in the first frame, wherein the estimator, in the first processing for estimation of an impulse response in the second frame, determines a column number of the first matrix, for which an inner product of the N-dimensional signal vector corresponding to the position information on the impulse response and a column component of the first matrix has a maximum, and wherein the estimator, in the second processing for estimation of an impulse response in the second frame, determines a column number of the first matrix, for which an inner product of the exclusion N-dimensional signal vector corresponding to the position information on the impulse response and a column component of the first matrix has a maximum.

4. The receiver according to claim 3, wherein in estimation of an impulse response in the (L+1) frame subsequent to the Lth frame, the position information on the impulse response is time dimension information which corresponds to a first column number of the first matrix and a second column number prior to and subsequent to the first column number, the first and second column numbers being determined by executing the first processing and further executing the second processing repeatedly for estimation of an impulse response in the Lth frame, wherein the estimator, in the first processing for estimation of an impulse response in the (L+1) frame, determines a column number of the first matrix, for which an inner product of the N-dimensional signal vector corresponding to the position information on the impulse response and a column component of the first matrix has a maximum, wherein the estimator, in the second processing for estimation of an impulse response in the (L+1) frame, determines a column number of the first matrix, for which an inner product of the exclusion N-dimensional signal vector corresponding to the position information on the impulse response and a column component of the first matrix has a maximum, and wherein L is an integer greater than or equal to 2.

5. The receiver according to claim 3, wherein when magnitudes of impulse responses in time dimension corresponding to the first column number and the second column number are each greater than or equal to a predetermined value, the estimator determines that position information on the impulse responses is the time dimension information corresponding to the first column number and the second column number.

6. The receiver according to claim 3, wherein the estimator stops the repeated execution of the second processing when the number of execution iterations of the first and second processing reaches the K or a magnitude of the exclusion N-dimensional signal vector becomes greater than or equal to a predetermined magnitude.

7. The receiver according to claim 1, wherein the estimator, in the first processing, sets the provisional impulse response vector to a vector which is obtained by multiplying a pseudo inverse matrix of the second matrix by the N-dimensional signal vector, and wherein the estimator, in the second processing, sets the provisional impulse response vector to a vector which is obtained by multiplying a pseudo inverse matrix of the new second matrix by the exclusion N-dimensional signal vector.

8. The receiver according to claim 2, wherein the estimator makes estimation of an impulse response for frames having a predetermined interval in continuous frames, the estimation having been made for the first frame, and wherein, for the frames having the predetermined interval, the estimator estimates the impulse response from a pilot signal corresponding to the position information which is already calculated for immediately preceding frame, and determines position information on the estimated impulse response.

9. A receiving method performed by a receiver that receives a frame including a pilot signal and a data signal, refers to an impulse response of a propagation path estimated from the pilot signal, and performs compensation processing on the data signal, the receiving method comprising:

extracting the pilot signal of the frame;

executing orthogonal matching pursuit method which is a decoding algorithm for compressive sensing;

referring to a pilot signal of a first frame;

estimating an impulse response;

determining position information on the estimated impulse response;

referring to a pilot signal corresponding to the determined position information, of a second frame subsequent to the first frame; and determining position information on the estimated impulse response;

wherein each of the pilot signal is an N-dimensional signal vector in a time domain, wherein the estimating further comprises transformation between the N-dimensional signal vector and a K-dimensional impulse response vector, represented by a first matrix with N rows and K columns, indicating a time position of the impulse response, in execution of the OMP method, wherein the estimating further comprises executing first processing including:

determining a column number of the first matrix, for which an inner product of the N-dimensional signal vector and a column component of the first matrix has a maximum, connecting a column vector for the column number in the first matrix to right side of 0 matrix so as to generate a second matrix, and estimating a provisional impulse response vector based on the second matrix and the N-dimensional signal vector, wherein the estimator repeatedly executes second processing including:

determining a column number of the first matrix, for which an inner product of an exclusion N-dimensional signal vector and a column component of the first matrix has a maximum, the exclusion N-dimensional signal vector being obtained by excluding the already estimated provisional impulse response from the N-dimensional signal vector, connecting a column vector for the column number in the first matrix to right side of the second matrix so as to generate a new second matrix, and estimating a provisional impulse response vector based on the new second matrix and the exclusion N-dimensional signal vector, wherein the estimating further comprises estimating an impulse response based on the column number determined in the second processing and the provisional impulse response vector estimated in the second processing, and wherein each of N and K is an integer greater than or equal to 1.

* * * * *